(12) United States Patent
Malas

(10) Patent No.: US 9,948,658 B2
(45) Date of Patent: Apr. 17, 2018

(54) SYSTEM AND METHOD FOR AUTHORIZING AND VALIDATING USER AGENTS BASED ON USER AGENT LOCATION

(71) Applicant: LEVEL 3 COMMUNICATIONS, LLC, Broomfield, CO (US)

(72) Inventor: Daryl Malas, Broomfield, CO (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

(21) Appl. No.: 15/332,672

(22) Filed: Oct. 24, 2016

(65) Prior Publication Data

US 2017/0041327 A1 Feb. 9, 2017

Related U.S. Application Data

(63) Continuation of application No. 12/055,007, filed on Mar. 25, 2008, now abandoned.

(51) Int. Cl.

| | |
|---|---|
| G06F 7/04 | (2006.01) |
| G06F 17/00 | (2006.01) |
| G06F 12/14 | (2006.01) |
| H04L 29/06 | (2006.01) |
| H04L 9/32 | (2006.01) |
| G06F 21/00 | (2013.01) |
| G06F 21/31 | (2013.01) |

(52) U.S. Cl.
CPC ............ H04L 63/107 (2013.01); G06F 21/31 (2013.01); H04L 63/08 (2013.01); H04L 63/10 (2013.01); *G06F 2221/2111* (2013.01); *G06F 2221/2129* (2013.01)

(58) Field of Classification Search
CPC ....... H04L 63/107; H04L 63/08; H04L 63/10; G06F 21/31; G06F 2221/2111; G06F 2221/2129
USPC ............. 726/4, 5, 12, 23; 713/153, 168, 182
See application file for complete search history.

(56) References Cited

U.S. PATENT DOCUMENTS

| | | | |
|---|---|---|---|
| 5,500,890 A | 3/1996 | Rogge et al. | |
| 5,557,748 A * | 9/1996 | Norris | H04L 29/06 709/220 |
| 5,825,876 A | 10/1998 | Peterson, Jr. | |
| 6,457,129 B2 | 9/2002 | O'mahony | |
| 6,583,716 B2 | 6/2003 | Rangarajan et al. | |

(Continued)

*Primary Examiner* — Aravind K Moorthy

(57) ABSTRACT

An embodiment of a method includes receiving a request from a user agent to use a communication network, determining that the user agent is not recognized on the communication network, and requiring submission of location information prior to allowing the user agent to use the network. An embodiment of a system includes a recognition module configured to determine whether the communication device is recognized in response to a request to use a communication network from the communication device, a notification module configured to notify the communication device that the communication device is not recognized, wherein notification that the communication device is not recognized indicates that location information must be submitted prior to the communication device using the communication network; and a location update module configured to receive submitted location information and update the location of the communication device based on the location information.

16 Claims, 6 Drawing Sheets

(56) References Cited

U.S. PATENT DOCUMENTS

| | | | |
|---|---|---|---|
| 6,735,429 B1 | 5/2004 | Adamany et al. | |
| 2002/0188842 A1 | 12/2002 | Willeby | |
| 2003/0129991 A1* | 7/2003 | Allison | H04Q 3/0025 |
| | | | 455/456.1 |
| 2003/0212912 A1 | 11/2003 | Bajko et al. | |
| 2003/0217122 A1 | 11/2003 | Roese et al. | |
| 2003/0225864 A1 | 12/2003 | Gardiner et al. | |
| 2006/0195889 A1 | 8/2006 | Pfleging et al. | |
| 2008/0104259 A1* | 5/2008 | LeFevre | H04L 67/1097 |
| | | | 709/228 |
| 2008/0104411 A1* | 5/2008 | Agrawal | H04L 9/3226 |
| | | | 713/183 |
| 2008/0271109 A1 | 10/2008 | Singh et al. | |
| 2009/0036126 A1* | 2/2009 | Morikuni | H04W 12/08 |
| | | | 455/435.2 |
| 2009/0111487 A1* | 4/2009 | Scheibe | H04L 67/18 |
| | | | 455/456.6 |
| 2009/0119762 A1* | 5/2009 | Thomson | G07C 9/00031 |
| | | | 726/7 |
| 2009/0222669 A1* | 9/2009 | Huang | G06F 21/33 |
| | | | 713/182 |
| 2009/0222902 A1 | 9/2009 | Bender et al. | |
| 2009/0249456 A1 | 10/2009 | Malas | |
| 2009/0300357 A1* | 12/2009 | Kumar | H04L 41/042 |
| | | | 713/171 |
| 2010/0199330 A1* | 8/2010 | Schott | H04L 65/1073 |
| | | | 726/4 |

* cited by examiner

SYSTEM AND METHOD FOR AUTHORIZING AND VALIDATING USER AGENTS BASED ON USER AGENT LOCATION

TECHNICAL FIELD

Embodiments of the present invention generally relate to telecommunications. More specifically, embodiments relate to a system and method for authorizing and validating user agents based on user agent location.

BACKGROUND

In the field of telecommunications, with conventional communications technologies, it could generally be assumed that each communication device had a fixed location. Telecommunications companies, such as Local Exchange Carriers (LECs), typically gathered and stored location data (e.g., addresses) identifying the fixed location of each communication device. Location-based telecommunication services, such as 911 emergency services, could be delivered to a given caller using the stored location data and the caller's telephone number, with confidence that the user's location has not changed. With the advent of mobile or nomadic communications technologies, it can no longer be assumed that communication devices (e.g., cell phones, Voice over Internet Protocol (VoIP) phones), and their users, have fixed locations.

Nomadic communication devices are designed for mobility. Users can travel from city to city using their phones, for example, typically without any observed change in telecommunication service. However, if the user requires a location-based service, the service may not be able to be provided because the user's previously identified location has changed, unless the user has updated his/her location with the service provider. Conventionally, location-based communication service providers, providing nomadic communication services, have relied on users to notify the service provider when users move to another geographically identified location. However, often users don't remember to notify their service providers, or assume they will not require location-based services.

For example, if the user is on a short business trip, and chose to take their geographically identified communication device with them the user may not think it's worth while to notify the service provider of his/her new temporary hotel address. However, it is entirely possible the nomadic user will require location-based services at their new location. For example, the user may require 911 emergency service (or enhanced 911 (E-911)) at the new location. In such a case, if the user failed to notify the provider of the user's new location, emergency personnel may be dispatched to the wrong address, and the user may not receive critical emergency care on time or at all.

It is with respect to these and other problems that embodiments of the present invention have been created.

SUMMARY

Embodiments of the present invention generally relate to telecommunications. More specifically, embodiments relate to a system and method for authorizing and validating user agents based on user agent location.

An embodiment of a method includes receiving a request from a user agent to use a communication network, determining that the user agent is not recognized on the communication network, and requiring submission of location information prior to allowing the user agent to use the network. The request may identify the user agent. The method may further include receiving the location information from an authorization server. The location information may be submitted to the authorization server from the user agent.

In an embodiment of the method determining that the user agent is not recognized may include determining whether valid authorization credentials exist that correspond to the user agent. The method may further include receiving authorization credentials from the authorization server. Further still, the method may include receiving another request to use the network from the user agent, and determining that the user agent is recognized based at least in part on the authorization credentials. Receiving the authorization credentials may involve receiving authorization credentials that were generated in response to the user agent submitting the location information.

The location information is entered manually by a user of the user agent. The location information may be automatically determined and submitted by the user agent. The method may further involve invalidating the authorization credentials after a timeout time expires if the user agent does not register again within the timeout time. The method may still further include setting the timeout time by a registrar. Further still, the method may include notifying the user agent of the timeout time by the registrar; and storing the timeout time by the user agent.

Further yet, the method may include notifying the user agent that the user agent is not recognized by sending an authentication failure message to the user agent. The request to use the communication network may include a request to register on the communication network.

An embodiment of a system includes a recognition module configured to determine whether the communication device is recognized in response to a request to use a communication network from the communication device, a notification module configured to notify the communication device that the communication device is not recognized, wherein notification that the communication device is not recognized indicates that location information must be submitted prior to the communication device using the communication network; and a location update module configured to receive submitted location information and update the location of the communication device based on the location information.

Another embodiment of a system for determining a location of a communication device includes a validation module configured to determine whether the communication device is recognized in response to a request to use a communication network from the communication device, a notification module configured to notify the communication device that the communication device is not recognized, wherein notification that the communication device is not recognized indicates that location information must be submitted prior to the communication device using the communication network, and a location update module configured to receive submitted location information and update the location of the communication device based on the location information.

An embodiment of the system may further include a timer module configured to determine whether the communication device has registered within a designated period of time. Still further, the system may include an authorization credentials update module configured to validate authorization credentials received from an authorization module. The update module may be further configured to invalidate the authorization credentials based on a timeout indication from the timer module. The system may further include an authorization server configured to receive location information from the communication device and issue updated authorization credentials to the communication device.

In some embodiments of a system the authorization server may be further configured to send the location information to a location maintenance service. The recognition, notification, and location update modules may be part of a registration server. The communication device may be configured to determine location in response to an unauthorized message from the notification module and submit the location to the authorization server.

Some embodiments relate to a computer program product including computer-readable media having instructions executable by a processor for carrying out methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the present invention will be apparent from the following more particular written description of various embodiments of the invention as further illustrated in the accompanying drawings and defined in the appended claims.

Figure 1:
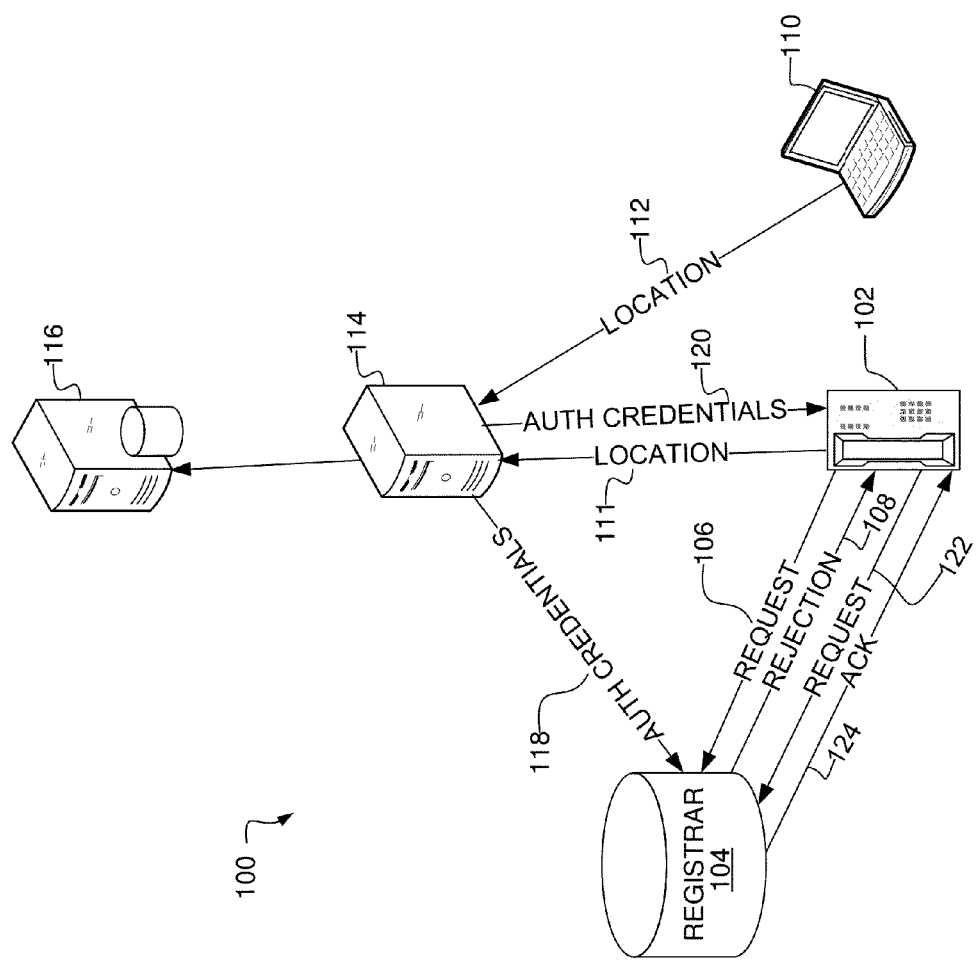
FIG. 1 illustrates an operating environment suitable for authorizing and validating a user agent based on user agent location.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention generally relate to telecommunications. More specifically, embodiments relate to a system and method for authorizing user agents and validating location of user agents. Embodiments described herein relate to the Session Initiation Protocol (SIP); however, the invention is not limited to SIP.

Prior to describing one or more preferred embodiments of the present invention, definitions of some terms used throughout the description are presented.

Definitions

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

FIG. 1 illustrates a system 100 for authorizing and validating a user agent based on user agent location. In general, the system makes a determination whether a user agent has changed locations and based on that determination, requires location data to be submitted before permitting the user agent to use the network. In one embodiment, the determination that the user agent has moved locations is based on whether the user agent has registered within a certain time period. If the user agent does not register within the time period, new authorization credentials must be obtained by submitting updated location information, before the user agent can receive or place calls over the network.

In FIG. 1, a user agent, such as a VoIP telephone 102, is in communication with a registrar 104. In order to use the communications network, the user agent 102 issues a request 106, which may be a registration request in Session Initiation Protocol (SIP). The registrar 104 attempts to validate the requesting user agent 102, using identification information in the request 106. The registrar 104 searches for valid authorization credentials corresponding to the user agent 102 and/or the user.

If no valid authorization credentials are found, the registrar 104 issues a rejection 108, such as a "401 Unauthorized" message, to the user agent 102. The user at the user agent 102 receives the notice that the user agent 102 is unauthorized. The user may also be notified that his location (or the location of the user agent 102) must be submitted. In one embodiment, the user can submit location information through a computer, such as laptop computer 110. In addition or alternatively, the user agent 102 may submit location information.

In some embodiments, the user may use a soft VoIP phone, or other device as the user agent 102. User agents 102, such as VoIP telephones, soft VoIP phones or others, may be operable to automatically determine the location. For example, the user agent may have Global Positioning System (GPS) functionality whereby the location can be automatically determined by the user agent in response to a rejection 108.

The user agent 102 may be further capable of automatically transmitting user ID/login and submitting 111 the location information to an authorization server 114. In one embodiment the user agent 102 dynamically submits 111 location information in response to a message (e.g., unauthorized message) from the server 114. Submission 111 of the location information by the user agent 102 may occur in conjunction with submission of the location information by the user through the user agent 102 or other means.

In addition to the user agent 102 submitting 111 location information, or in cases where the user agent 102 does not automatically determine and/or submit 111 the location information, the user can enter the location through a computing device 110 or the user agent 102 itself. First the user logs into the authorization server 114 and submits ID and login information.

Whether the user ID and login information is submitted manually or automatically, the authorization server 114 validates the login information. Assuming the ID and login are valid, the location information is then submitted 112 or 111. The location information can be in any number of formats, such as, but not limited to, address, zip code, region, county, LATA, or lat/lon. The authorization server 114 receives the location information.

In some embodiments, the authorization server 114 sends the location information to an optional location maintenance service database 116. The location maintenance service maintains locations for users in the database 116 so that emergency services providers (e.g., Public Safety Answering Point (PSAP)) can dynamically determine locations of users.

The authorization server 114 generates new credential information for the user agent 102. The new credential information is sent 118 to the registrar 104. The registrar 104 saves the authorization credentials in association with ID information related to the user agent 102. A configuration file is sent 120 to the user agent 102. The configuration file includes the updated authorization credentials that correspond to the user agent 102. The user agent 102 receives and stores the configuration file. The user agent 102 then reinitializes (e.g., reboots, restarts, re-loads, etc.) with the new credentials.

After reinitializing, the user agent 102 issues another request 122, such as a SIP registration, to the registrar 104. The registrar 104 searches the authorization credentials for valid credentials related to the requesting user agent 102. This time, the registrar 104 finds valid authorization credentials (those that were provided by the authorization server 114) and acknowledges 124 the registration request. When SIP is used, the acknowledgment is a "200 OK" message.

After a valid registration by the user agent 102, the registrar 104 monitors re-registration of the user agent 102 to determine if the user agent 102 registers again within a designated amount of time. The registrar 104 may notify the user agent 102 of the designated amount of time. The designated amount of time may be configured by an administrator or other user. If the user agent 102 does not register again within the designated amount of time, the registrar 104 invalidates the authorization credentials that correspond to the user agent 102. If the user agent 102 does register in a timely manner, the timer is restarted and the user agent 102 must continue to register within the designated time period.

This registration and re-registration process continues without the need to re-submit location information, until the user agent 102 fails to register within the designated time period. If the designated time expires before the user agent 102 registers, it is assumed by the registrar that the user agent 102 has moved locations and the registrar 104 forces the user agent 102 to re-submit the location. The registrar 104 forces the new location information to be submitted by invalidating the user agent's authorization credentials, thereby requiring submission of the location information before network registration is allowed.

Figure 2:
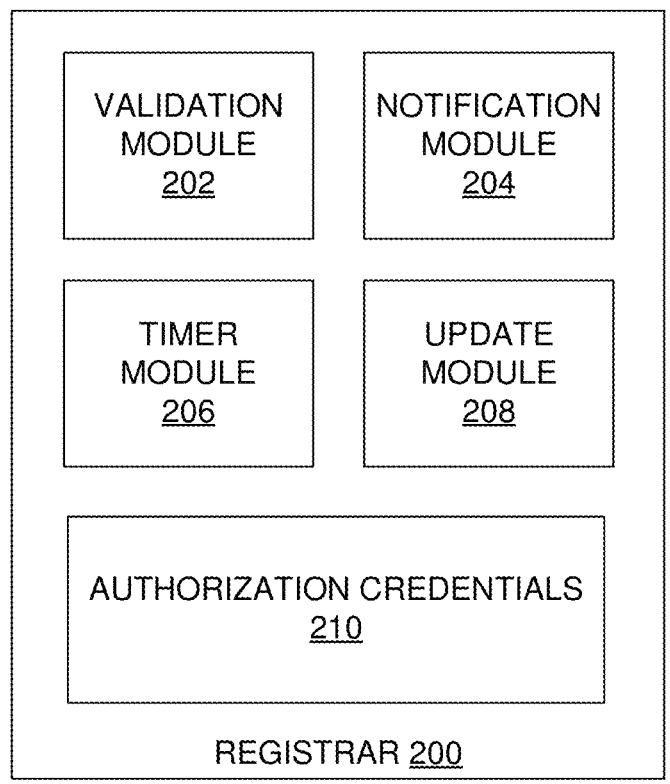
FIG. 2 illustrates and exemplary registrar system in accordance with one embodiment.

FIG. 2 illustrates an exemplary registrar system 200 that may be used in accordance with one embodiment. The registrar system 200 includes a validation module 202, a notification module 204, a timer module 206, an update module 208 and authorization credentials 210.

The validation module 202 is operable to receive registration requests and validate the requests. This may involve determining if the user agent is recognized, using authorization credentials 210. The validation module 202 determines if a valid set of authorization credentials exist in the authorization credentials 210 for a given user agent that is attempting to register. Typically a registration request includes user agent identification information that the validation module 202 can use to determine if valid credentials exist that correspond to the identified user agent.

The notification module 204 is operable to send user agents various messages. Among other messages, the notification module 204 notifies the user agent if it is determined the user agent is not recognized by the validation module 202. In this case, a "401 Unauthorized" message may be sent by the notification module 204. Alternatively, the notification module 204 also notifies the user agent if the user agent is recognized, by sending a "200 OK" message.

The timer module 206 is operable to determine how long it has been since the user agent last registered. If the user agent has not registered within a designated amount of time, the time module 206 issues a signal to the update module 208 to invalidate the user agent's authorization credentials. If the user agent does register within the designated amount of time, the timer module 206 restarts the timer and does not issue the invalidation signal.

The update module 208 is operable receive authorization credentials from a trusted source, such as an authorization server and store them in the authorization credentials 210 of the registrar. As indicated, the update module 208 is operable to invalidate authorization credentials when they expire (i.e., when the user agent fails to register within a designated time period). In one embodiment, the update module 208 may erase the authorization credentials for any user agent that fails to register within the designated time. In other embodiments, the update module 208 can set an invalidity flag that indicates the authorization credentials are invalid.

Exemplary Operations

Figure 3:
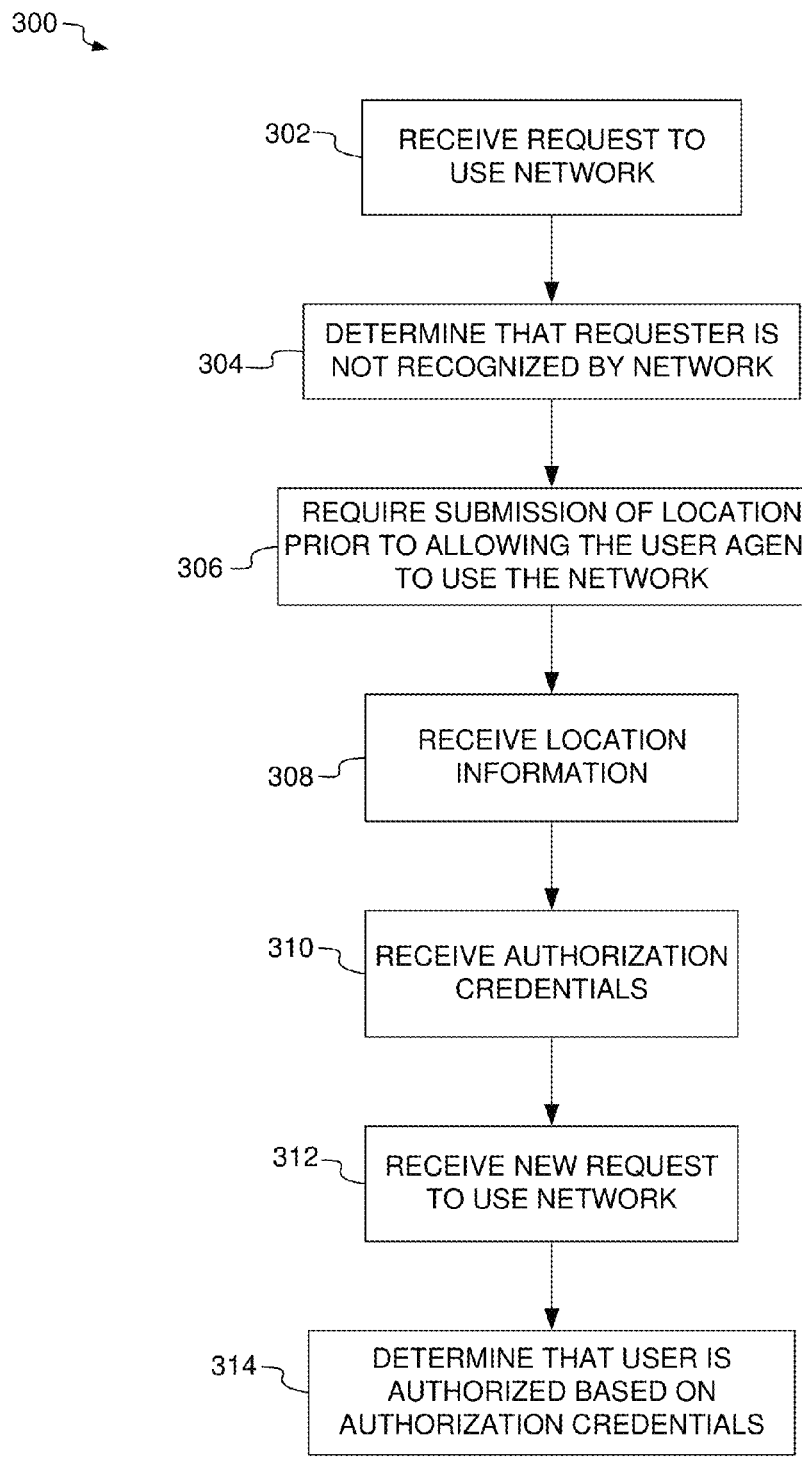
FIGS. 3-5 are flow charts illustrating algorithms useful for authorizing and validating a user agent based on user agent location.

FIG. 3 is a flowchart illustrating an algorithm 300 for forcing a user agent to submit updated location information prior to allowing the user agent to use the network. The algorithm 300 may be carried out by a registrar, such as registrar 104 in FIG. 1.

In a receiving operation 302, a request is received to use the network. The request is received from a user agent and identifies the user agent. In one embodiment, the request is an attempt by the user agent to register on the network; e.g., a SIP registration.

In a determining operation 304, it is determined that the user agent that made the request is not recognized on the network. The determining operation 304 may involve searching for valid authorization credentials corresponding to the user agent. If no valid authorization credentials are found, the user agent is not recognized.

In a requiring operation 306, the user agent is required to submit location information before the user agent will be permitted to use the network. Until the user agent submits location information, the user agent will not be able to place outgoing calls or accept incoming calls. The user agent may be notified in some way that it is not authorized to use the network. This may involve sending a "401 Unauthorized" message, as in SIP. Such a message typically prompts the user agent to register. The user agent then submits authorization credentials. If the authorization credentials are invalid, the user agent will continue to attempt to register. If the attempt to register fails, the user agent or user will be required to submit location information using methods described herein or another method that may be known.

In a receiving operation 308, location information is received from the user agent. The location information may be received at a server other than the registrar and a different location. For example, the location information may be received by an authorization server. The authorization server is operable to validate a user's identity. The authorization server accepts location information and generates new authorization credentials for the user agent.

In another receiving operation 310, authorization credentials are received by the registrar. The authorization credentials may be sent by the authorization server that is trusted by the registrar. The registrar typically saves the credentials in association with the corresponding user agent. In another receiving operation 312, another request to use the network is received from the user agent. In SIP the request may take the form of a registration request. In a determining operation 314, it is determined that the user agent is recognized by the network and authorized to use the network, based at least in part on the authorization credentials. In a sending operation 316, an acknowledgment is sent to the user agent, acknowledging that the user agent is authorized to use the network.

Figure 4:
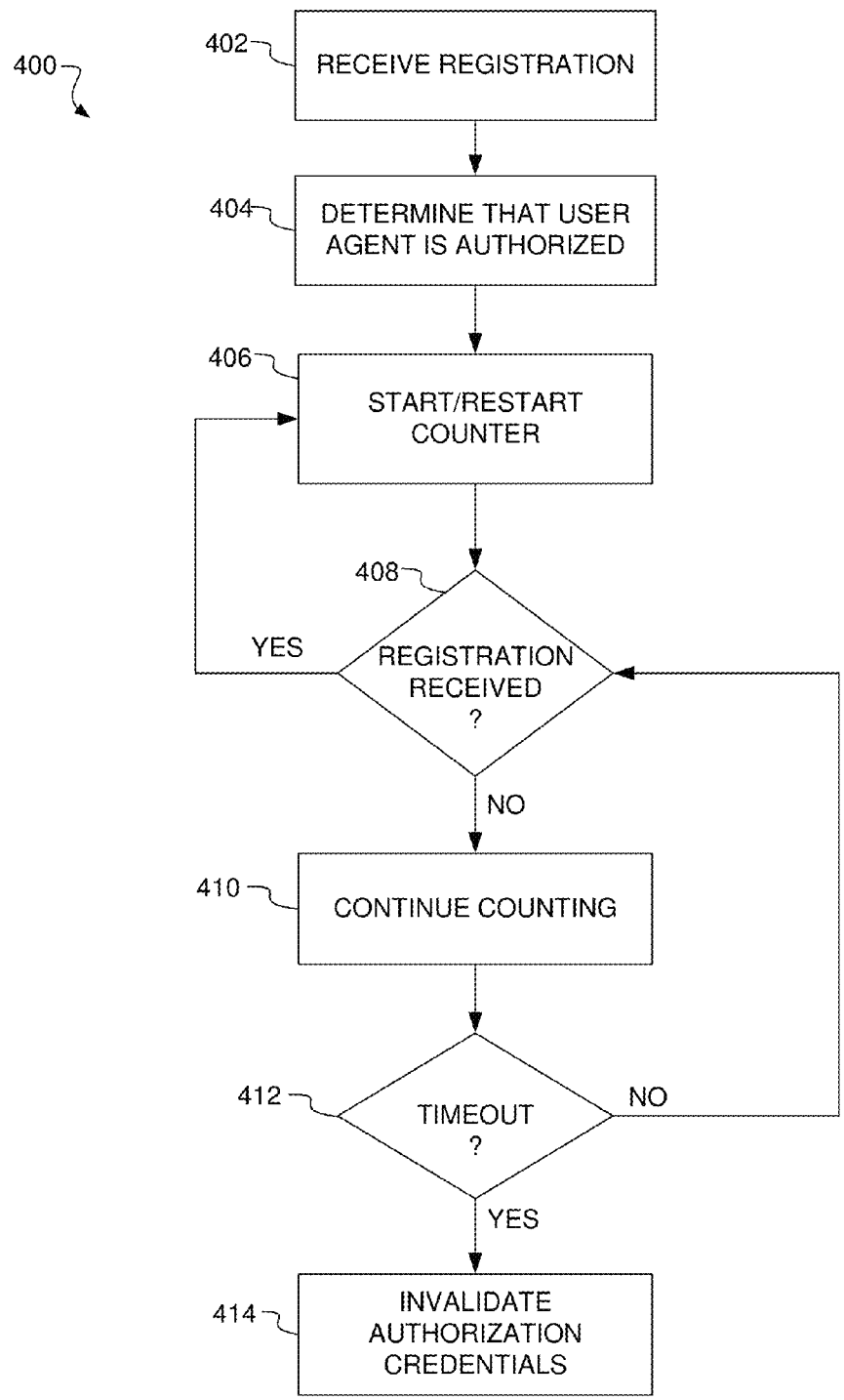

FIG. 4 is an algorithm 400 for invalidating user agent authorization credentials based on tardiness in registration by the user agent. This algorithm 400 may be carried out by a registrar such as registrar 104 in FIG. 1. In a receiving operation 402, a registration request is received from a user agent. In a determining operation 404, it is determined that the user agent is authorized to use the network. An acknowledgment is typically sent to the user agent indicating the user agent is authorized.

In a starting/restarting operation 406, a counter is started. The counter may start at a maximum count value and be decremented, or the counter may start at zero and incremented. For example, the designated time period for re-registration may be 10 minutes. In this case, the counter may be set to a number corresponding to 10 minutes. Alternatively, the counter may start at zero and be incremented until ten minutes have passed or until the user agent re-registers. In a query operation 408 it is determined whether a registration has been received by the user agent. If so, the algorithm branches "YES" back to the starting/restarting operation 406, where the counter is restarted.

If a registration request is determined to not to have been received in query operation 408, the algorithm branches "NO" to a continuing operation 410, where counting continues. Counting may increment or decrement the counter, depending on the implementation. In another query operation 412, it is determined whether the counter has timed out. This may involve checking whether the counter has reached a specified threshold value (if counter increments), or whether the counter has reached zero (if counter decrements). If there has not been a timeout event, the algorithm 400 branches "NO" back to query operation 408.

If the counter does timeout without receiving a registration within the threshold time, the algorithm 400 branches "YES" from the query operation 412 to an invalidating operation 414. In the invalidating operation 414, the authorization credentials corresponding to the user agent are invalidated. After invalidation, a response to an attempted registration by the user agent is a process such as the algorithm shown in FIG. 3.

Figure 5:
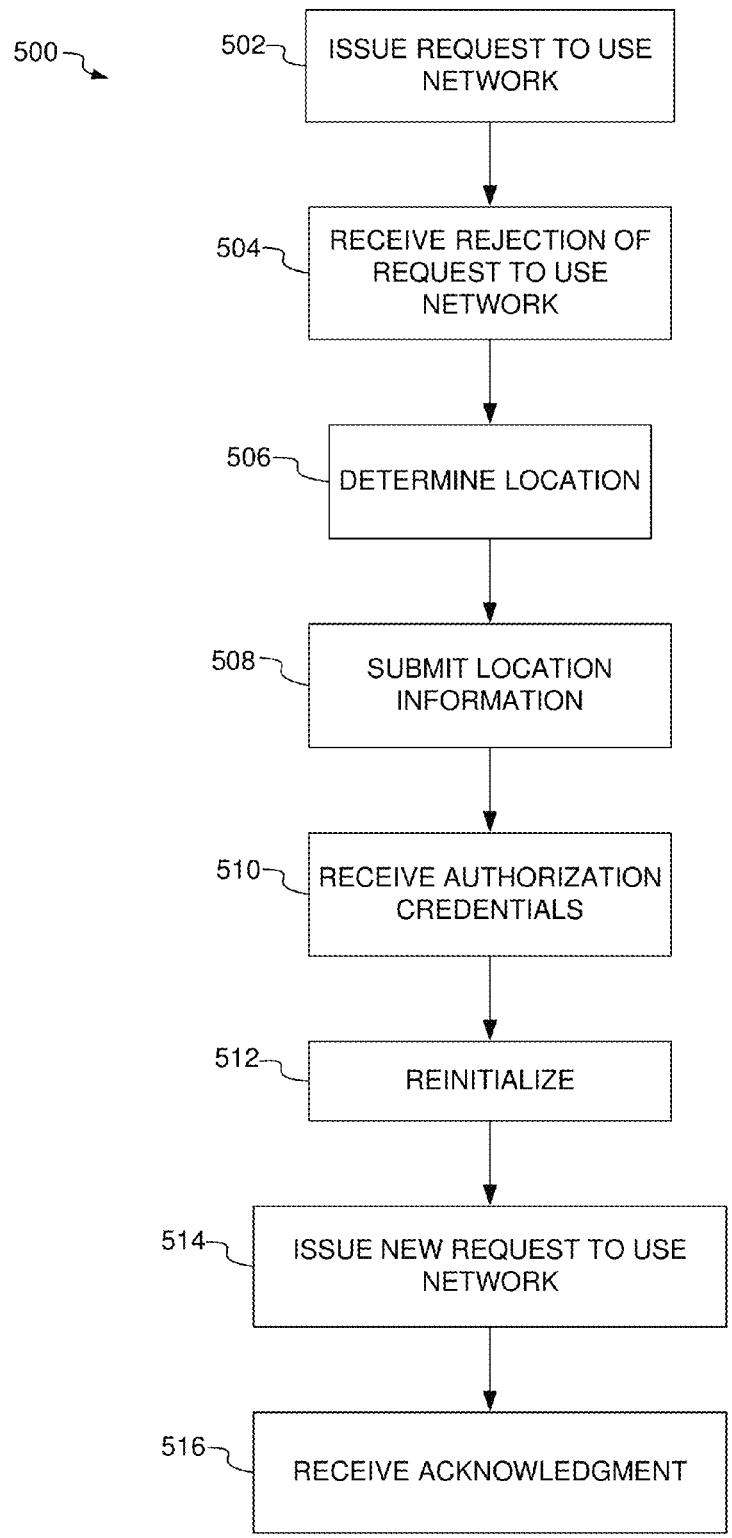

FIG. 5 is a flowchart illustrating an algorithm 500 that may be carried by a user agent (e.g., user agent 102 in FIG. 1) that has recently changed locations and is attempting to register with, and use, a network. In an issuing operation 502 the user agent issues a request, such as a SIP registration request, to use the network. In a receiving operation 504, the user agent receives an indication that the user agent is not authorized to use the network. This may involve receiving a message such as a rejection or a "401 unauthorized" message.

In response, the user agent determines the current location, in a determining operation 506. The determining operation 506 may be manual, automatic or a combination thereof. For example, the user agent may prompt the user to enter the current location (e.g., address, zip code, lat/lon, etc.). The user agent may also include Global Positioning System (GPS) technology, or some other automatic locating technology, which the user agent may use to automatically determine the current location.

In a submitting operation 508, the location is submitted. In the submitting operation, typically, the user logs in to an authorization server. The location information may be submitted in one or more formats, such as address, zip code, lat/lon, LATA, or others. The location information may be submitted to the authorization server, which is operable to issue new authorization credentials. In a receiving operation 510, new authorization credentials are received by the user agent. In some embodiments, the receiving operation 510 involves receiving a configuration file that includes the new authorization credentials.

In a reinitializing operation 512, the user agent loads the new authorization credentials. Reinitializing can be done different ways. In one embodiment, the reinitializing operation 512 reboots (e.g., restarts) the user agent. In another embodiment, a software service or application may detect the configuration change and begin using the new authorization credentials, or the configuration change may trigger a process in the user agent to load the new credentials. The reinitializing operation 512 may be in response to a command or other information supplied by the authorization server. After reinitializing, the user agent issues a new registration request in an issuing operation 514. In this case, the user agent is authorized and receives an acknowledgment in receiving operation 516. The user agent may also receive a time period designating a time within which the user agent must re-register.

Exemplary Computing Device

Figure 6:
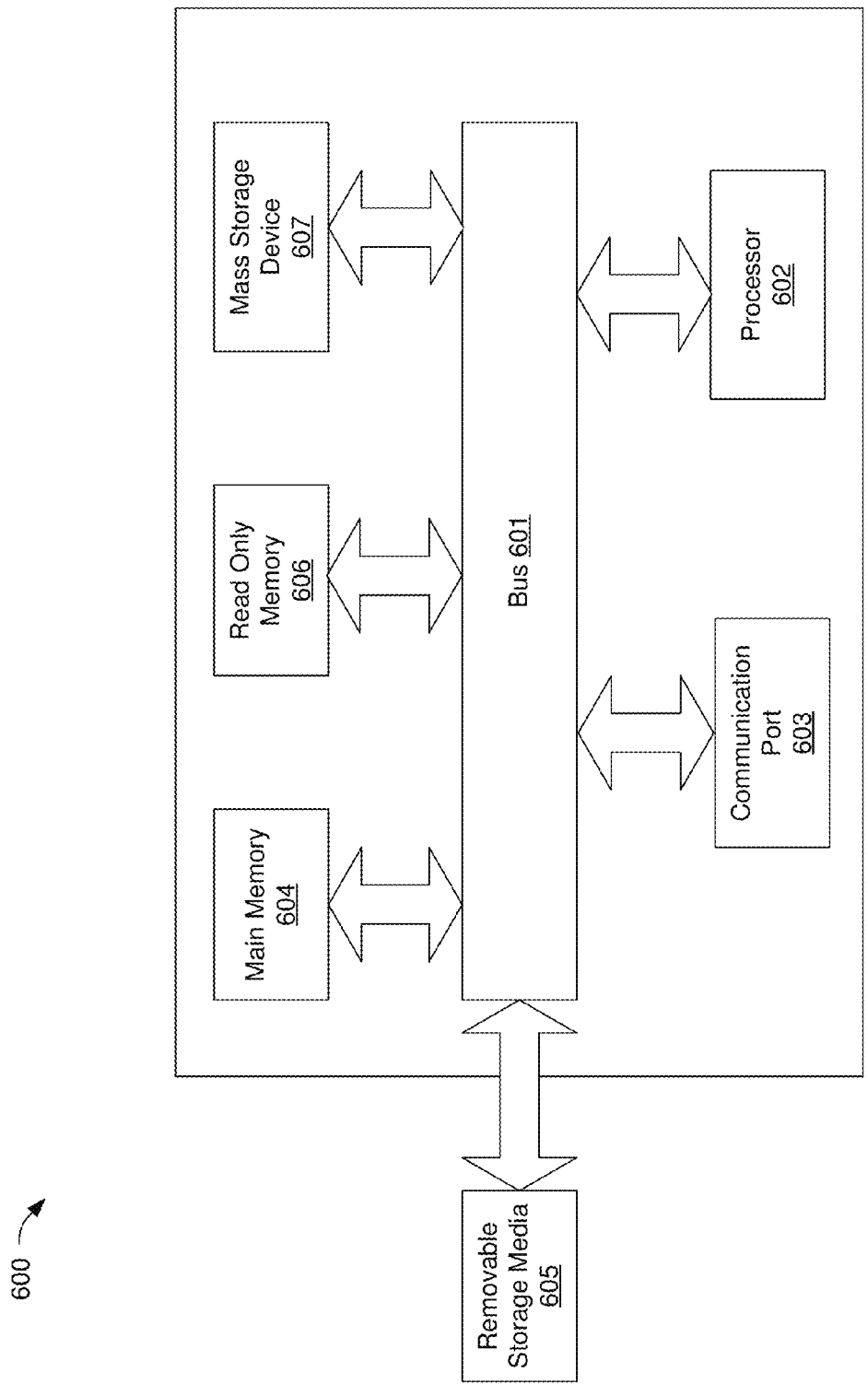
FIG. 6 illustrates a general purpose computing device upon which one or more aspects of embodiments of the present invention may be implemented.

FIG. 6 is a schematic diagram of a computing device 600 upon which embodiments of the present invention may be implemented and carried out. For example, one or more computing devices 600 may be used to issue a request to use a network or determine and submit location information. The computing device 600 may also act as a registrar or authorization server in accordance with embodiments of the invention. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 600 includes a bus 601, at least one processor 602, at least one communication port 603, a main memory 604, a removable storage media 605, a read only memory 606, and a mass storage 607. Processor(s) 602 can be any know processor, such as, but not limited to, an Intel® Itanium® or Itanium 2® processor(s), AMD® Opteron® or Athlon MP® processor(s), or Motorola® lines of processors. Communication port(s) 603 can be any of an RS-232 port for use with a modem based dialup connection, a 10/100 Ethernet port, a Gigabit port using copper or fiber, or a USB port. Communication port(s) 603 may be chosen depending on a network such a Local Area Network (LAN), Wide Area Network (WAN), or any network to which the computing device 600 connects. The computing device 600 may be in communication with peripheral devices (not shown) such as, but not limited to, printers, speakers, cameras, microphones, or scanners.

Main memory 604 can be Random Access Memory (RAM), or any other dynamic storage device(s) commonly known in the art. Read only memory 606 can be any static storage device(s) such as Programmable Read Only Memory (PROM) chips for storing static information such as instructions for processor 602. Mass storage 607 can be used to store information and instructions. For example, hard disks such as the Adaptec® family of SCSI drives, an optical disc, an array of disks such as RAID, such as the Adaptec family of RAID drives, or any other mass storage devices may be used.

Bus 601 communicatively couples processor(s) 602 with the other memory, storage and communication blocks. Bus 601 can be a PCI/PCI-X, SCSI, or USB based system bus (or other) depending on the storage devices used. Removable storage media 605 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Embodiments of the present invention include various steps, which will be described in this specification and attached Appendix. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method comprising:
receiving a request at a registration server from a user agent to use a communication network, the registration server comprising at least one processor, wherein the request identifies the user agent;
determining that the user agent is not recognized on the communication network, wherein the determining step comprises:
determining that no valid authorization credentials exist that correspond to the user agent;
requiring, in response to determining that the user agent is not recognized on the communication network, submission of location information by the user agent prior to allowing the user agent to use the network;
receiving the location information from an authorization server, wherein the location information is submitted to the authorization server from the user agent;
receiving, by the registration server, authorization credentials from the authorization server, wherein the receiving authorization credentials step comprises:
receiving authorization credentials that were generated in response to the user agent submitting the location information;
receiving another request to use the network from the user agent; and
determining that the user agent is recognized based at least in part on the authorization credentials.

2. The method as recited in claim 1, wherein the location information is entered manually by a user of the user agent.

3. The method as recited in claim 1, wherein the location information is automatically determined and submitted by the user agent.

4. The method as recited in claim 1 further comprising invalidating the authorization credentials after a timeout time expires if the user agent does not register again within the timeout time.

5. The method as recited in claim 4, further comprising setting the timeout time by a registrar.

6. The method as recited in claim 5, further comprising:
notifying the user agent of the timeout time by the registrar; and
storing the timeout time by the user agent.

7. The method as recited in claim 1, further comprising notifying the user agent that the user agent is not recognized by sending an authentication failure message to the user agent.

8. The method as recited in claim 1, wherein the request to use the communication network comprises a request to register on the communication network.

9. A registration server comprising:
at least one processor;
memory, operatively connected to the at least one processor and storing instructions that, when executed by the at least one processor, cause the registration server to perform a method, the method comprising:

receiving a request from a user agent to use a communication network wherein the request identifies the user agent;

determining that the user agent is not recognized on the communication network, wherein the determining step comprises:

determining that no valid authorization credentials exist that correspond to the user agent;

requiring, in response to determining that the user agent is not recognized on the communication network, submission of location information by the user agent prior to allowing the user agent to use the network;

receiving the location information from an authorization server, wherein the location information is submitted to the authorization server from the user agent;

receiving authorization credentials from the authorization server, wherein the receiving authorization credentials step comprises:

receiving authorization credentials that were generated in response to the user agent submitting the location information;

receiving another request to use the network from the user agent; and determining that the user agent is recognized based at least in part on the authorization credentials.

10. The registration server as recited in claim 9, wherein the location information is entered manually by a user of the user agent.

11. The registration server as recited in claim 9, wherein the location information is automatically determined and submitted by the user agent.

12. The registration server as recited in claim 9, the method further comprising invalidating the authorization credentials after a timeout time expires if the user agent does not register again within the timeout time.

13. The registration server as recited in claim 12, the method further comprising setting the timeout time by a registrar.

14. The registration server as recited in claim 13, the method further comprising:

notifying the user agent of the timeout time by the registrar; and storing the timeout time by the user agent.

15. The registration server as recited in claim 9, the method further comprising notifying the user agent that the user agent is not recognized by sending an authentication failure message to the user agent.

16. The registration server as recited in claim 9, wherein the request to use the communication network comprises a request to register on the communication network.

\* \* \* \* \*